United States Patent Office 3,154,589
Patented Oct. 27, 1964

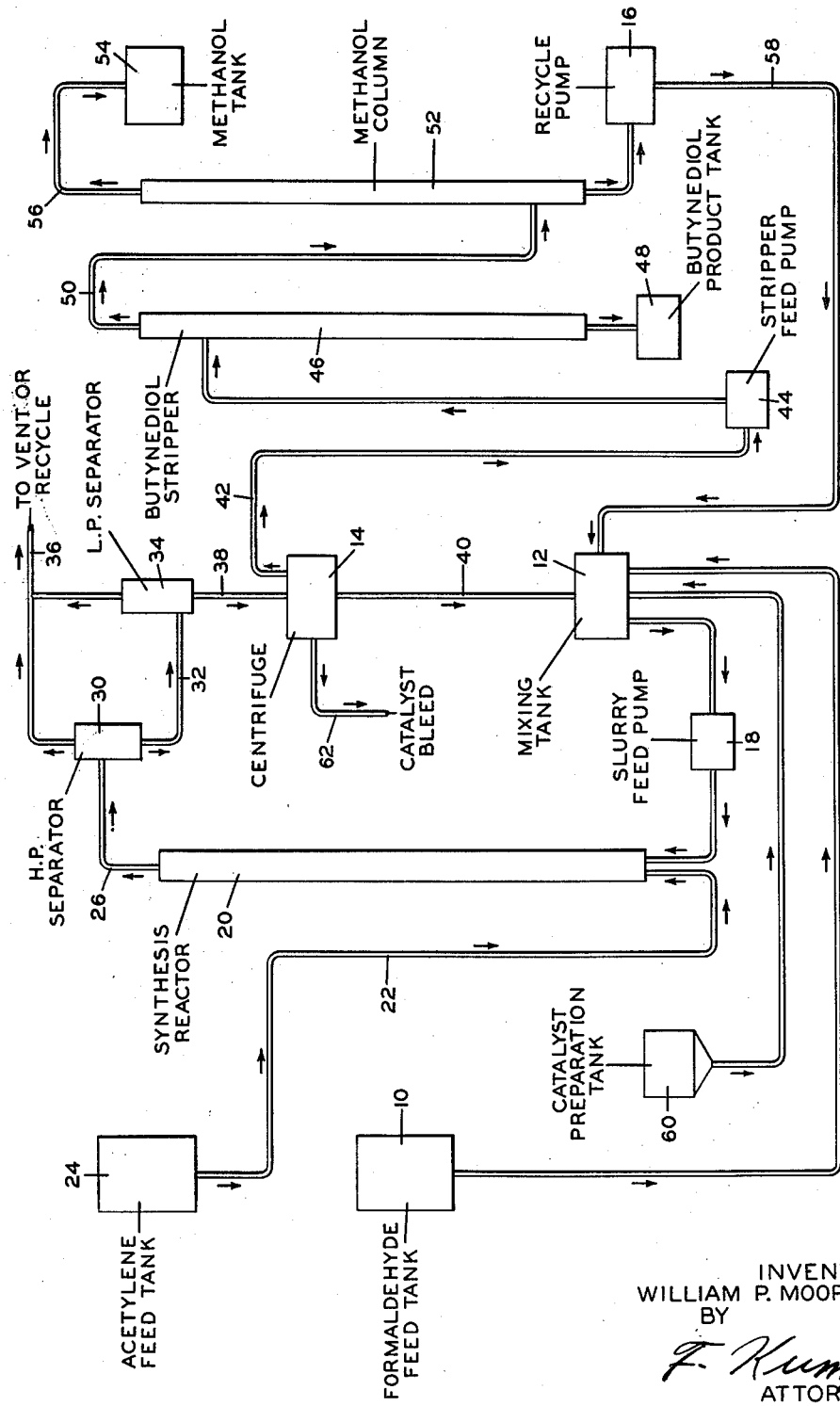

3,154,589
PROCESS FOR BUTYNEDIOL
William P. Moore, Jr., Chester, Va., assignor to Allied Chemical Corporation, New York, N.Y., a corporation of New York
Filed June 27, 1960, Ser. No. 39,081
4 Claims. (Cl. 260—635)

This invention relates to a process for the production of an alkinediol; more specifically, it relates to an improved process of preparing the alkinediols from acetylene and aldehyde in the presence of cuprous acetylide.

A number of processes have been described in the prior art wherein acetylene and formaldehyde are reacted in the presence of cuprous acetylide for the purpose of preparing butynediol. In accordance with the description in British Patent 698,019, acetylene and formaldehyde are reacted continuously in the presence of a suspension of catalyst in the liquid reaction medium, the reaction zone being agitated by the continuous passage of acetylene therethrough. However, a quiescent zone is maintained near the top of the reactor, thereby permitting the crude product to be withdrawn from the top of the reactor without taking the catalyst along therewith, and by continuously supplying fresh formaldehyde solution the process is thus carried on for periods without catalyst replacement, but must shut down when the spent catalyst is to be replaced.

In still another process as described in U.S. Patent 2,712,560, the reaction is carried out in the presence of a fixed bed catalyst.

While these prior art processes lead to the production of butynediol, it is an object of this invention to provide an improved process which will be more economical than any of those now available to the prior art which will lend itself to improved temperature control, improved catalyst activity, improved catalyst life, low cuprene formation and continuous operation without need for shutdown to replace spent catalyst.

The above objects are attained in accordance with this invention by physically separating, periodically at intervals ranging between the about 0.25 hour and about 5 hours, the solid catalyst from the accompanying liquid including an aqueous product phase and an organic by-product phase containing a low molecular weight liquid or dissolved form of cuprene or cuprene precursor, by means adapted to separate the mutually insoluble liquid components from the solids with the lowest density phase, here the organic phase rather than the aqueous phase, being removed preferentially from the solids. Hereinafter the form of cuprene or cuprene precursor in the by-product organic liquid phase is referred to as "soluble cuprene."

Whatever the concentration of the soluble cuprene retained with the catalyst at this stage, it is greatly diluted when it is mixed with the fresh feed as it is recycled. This differentiates the process from one in which liquid with relatively high soluble cuprene concentration is permitted to remain over a long period of time in contact with the catalyst whereby the usual insoluble form of cuprene builds up on the catalyst surface, e.g. specifically a process as in above-cited British Patent 698,019 in which the portion of the catalyst positioned farthest away from the point of introduction of fresh feed to the reactor is retained in the reactor and so remains in contact with that portion of the reaction mixture having the highest soluble cuprene concentration.

More particularly in accordance with this invention, the acetylene is reacted in aqueous medium with the aldehyde in a cyclic operation in which finely divided slurried supported cuprous acetylide catalyst is continuously passed through the reaction zone concurrently with the reactants and the suspension of catalyst is continuously discharged from the reaction vessel along with the product after a retention time of 0.25–5 hours, and the catalyst is separated from the accompanying liquid by means such as a solid bowl centrifuge, yielding a recovered catalyst essentially free of cuprene. The separated catalyst is recycled for commingling with the feed stream to the reactor while the unreacted acetylene and formaldehyde are recovered from the butynediol product and recycled as an aqueous solution to the reactor.

The process of this invention features a recycle operation with finely divided slurried cuprous acetylide catalyst supported on silica gel or activated carbon, which catalyst is well separated from accompanying organic liquid phase as one operation of the cycle. The catalyst passes into the reaction with the aldehyde feed and out with the reaction product. It is important that the slurried catalyst does not remain in the reaction under reaction conditions but is freed of most of its accompanying organic liquid by-product at intervals of about 5 hours or less. Apparently, the organic liquid by-product, containing soluble cuprene, tends to concentrate in the vicinity of and upon the catalyst, perhaps because it is not dissolved away in the aqueous reaction medium as is the butynediol product. Thus, without a special procedure for removal of this by-product from the catalyst, as provided by this invention, the soluble cuprene concentration continuously builds up around the catalyst with the consequence that the insoluble form of cuprene progressively deposits on the catalyst. By breaking this chain of events, the process of our invention enables unusually high space-time yields to be obtained.

Our process involves the following illustrative reactions:

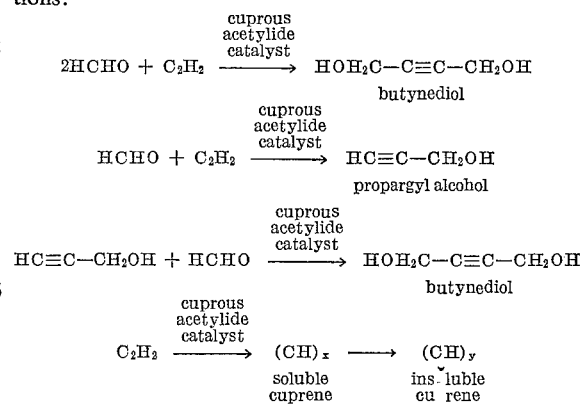

These reactions are exothermic and the process provides for heat removal from the reactor by direct cooling or indirect heat exchange. The heat is preferably removed by evaporative cooling. Under suitable synthesis conditions, formaldehyde conversion to butynediol per pass is from 75 to 95% of theory.

A desirable range of operating conditions for the synthesis is:

Reaction HCHO/$C_2H_2$ mol ratio _____ 1 to 5.
Make-up HCHO/$C_2H_2$ mol ratio _____ About 2.
Butynediol concentration of
  feed slurry _____ 3–12 wt. percent.
Reactor temperature _____ 115–135° C.
Reactor pressure _____ 75–125 p.s.i.g.
Liquid space velocity _____ 0.2–1.0 hr.$^{-1}$.
Catalyst carrier (of a size to
  pass through 300 mesh) _____ Silica gel or activated carbon.
Supported catalyst proportion
  in feed slurry _____ 7–14 wt. percent.
Proportion of cuprous acetylide
  in the supported catalyst ____ 20–30 wt. percent.

Commercial grades of acetylene and aqueous 37–50% formaldehyde are used as make-up in the process.

It should be understood, however, that the process is operable under broader conditions than those given above. In particular, the synthesis step may be carried out at a reactor temperature of 75–150° C., a reactor pressure of 0–350 p.s.i.g., a liquid space velocity of 0.2–4.0 hr.$^{-1}$ and with 150 mesh or smaller catalyst carrier.

The ratio of propargyl alcohol to butynediol produced in the reactor may be varied by changes in reaction conditions. High temperatures and pressures favor the production of propargyl alcohol.

In order to attain optimum space-time yield with moderate recycle of reactants, it is important to correlate space velocity through the reactor with the several reaction variables. For a given reaction temperature and conversion, the space velocity is dependent upon catalyst activity. Catalyst activity can be enhanced by increased cuprous acetylide concentration and use of 150 mesh or preferably 300 mesh or finer catalyst carriers.

A major advantage of the synthesis with slurried catalyst is the excellent temperature control achieved throughout the reactor. The absence of hot spots in the reactor results in long catalyst life, reduces formation of undesirable by-products such as cuprene, and increases safety of operation. With recycle operation it is possible to continuously remove soluble cuprene from the catalyst at a low stage of polymerization while it is still in organic liquid phase, thus prolonging the catalyst life over an indefinite period in contrast to catalysts of the prior art processes which become inoperable because of cuprene clogging within about 280 hours.

The retention time of the catalyst within the reactor and prior to being subjected to centrifugal separation has been found to be critical if the cuprene is to be carried away as soluble cuprene with the liquid product during the centrifuging step. This can best be seen from a study of the data obtained when a number of comparative runs were made to study the effect of reaction time on the cuprene content of the catalyst.

The catalyst consisted of 20.6 weight percent cuprous acetylide on silica gel of particle size to pass through a standard 300 mesh sieve. In each run 40 parts of catalyst were mixed with 667 parts of aqueous 37% formaldehyde and the mixture was treated with acetylene under pressure. All tests were made in a stainless steel reactor at 135° C. and acetylene pressure of about 90 p.s.i.g., but for a different retention time in each run. The reaction slurry was removed from the reactor and centrifuged in a solid bowl centrifuge at about 2,000 $g$ (2000 times gravitational acceleration) to separate butynediol aqueous phase, and organic phase containing soluble cuprene, from the catalyst. The residual catalyst which contained about 60% by weight of liquid associated therewith, based on the combined weight of the catalyst and liquid, was dried and analyzed for cuprene. Results are tabulated below. It will be seen that an increase in catalyst retention time in the reactor significantly increases the cuprene retained on the catalyst.

| Run Number | Catalyst Retention Time, Hours | Cuprene on Catalyst, Weight Percent |
|---|---|---|
| Unused catalyst | | 0.13 |
| 1 | 1 | 0.38 |
| 2 | 8 | 2.45 |
| 3 | 20 | 5.33 |
| 4 | 50 | 12.50 |
| 5 | 100 | 27.40 |

In a test in which the catalyst was reused, it was centrifuged at four-hour reaction intervals. It was found that the catalyst could be used repeatedly and after 120 cycles, the catalyst contained only 6 weight percent cuprene on a dry basis. It is noteworthy that the build-up of cuprene on the catalyst practically leveled off in continuous cyclic operation.

The following described experimental run shows that it is not possible to retain the catalyst in the reactor and simply use a short reaction period to minimize cuprene formation on the catalyst.

A fixed bed catalyst consisting of 25.6 weight percent cuprous acetylide on 4–8 mesh silica gel was placed in a vertical reactor and 14% formaldehyde solution was allowed to flow down over the catalysts, commingling with acetylene. The reactor was operated at 120–135° C. and 95 p.s.i.g. acetylene. Flow of formaldehyde was adjusted to give a relatively short reaction time of 2.2 hours. Formaldehyde conversion varied from 84.9% at the start of the run to 50.4% at 620 hours. After 644 hours reaction the catalyst was removed from the reactor, washed and dried. The dried catalyst contained 54.4% cuprene.

The type of centrifuge used and the speed at which it operates is also of importance. A suspended solid bowl centrifuge operated at 960 times the gravitational acceleration satisfactorily separated the catalyst from the butynediol product solution and cuprene giving 97% catalyst recovery. By operation of this centrifuge at 1800 $g$, more than 99% of the catalyst was recovered essentially free of cuprene. The data obtained using a suspended solid bowl centrifuge indicate that the slurry should be centrifuged at 960 times gravitational acceleration or above. The lower limit is critical for satisfactory catalyst separation from liquids, but the upper limit is based on cost considerations.

The effectiveness of the solid bowl centrifuge in contrast to other means of separation is believed to be due to presence in the centrifuge feed of three component phases, each having a different density; the most dense being the solid catalyst particles which build up on the wall of the centrifuge; the next most dense being the aqueous phase, the major portion of which is thrown off over the edge of the centrifuge but a small amount of which passes into and is entrapped in the interstices between the solid particles; and the lightest phase being the organic phase which is subject to lower centrifugal forces than the heavier phases and moreover tends to rise in the water layer. The organic liquid phase is believed to include relatively low molecular weight liquid or dissolved cuprene or cuprene precursors. As a consequence of the lower centrifugal forces thereon, the light organic phase tends to remain nearer the center of the centrifuge bowl than the heavier solids and water; and because of its lower density it tends to rise in the layer of water; hence, the organic phase is not carried to an appreciable degree into or through the collected solids. This leads to a preferential separation of the organic phase, including the cuprene therein, from the solid catalyst, since it avoids forcing the organic component into the interstices between the collected solid particles where it would be entrapped.

In contrast thereto in other types of centrifuges such as basket centrifuges, the lighter organic component, being subject to weaker centrifugal forces than either the catalyst particles or the aqueous component, may actually pass after the aqueous component through the collected solids, whereby much of the liquid entrapped in the interstices between the catalyst particles will be the organic liquid. Likewise in a filter, the organic layer will pass through the solids after the aqueous layer upon which it floats, so that the liquid retained in the catalyst will contain a correspondingly high proportion of the organic component.

The efficient recycle and recovery procedure is important in the process. The effluent from the reactor containing the slurried catalyst can be directed into a separator where excess acetylene can then be recovered. The catalyst can be centrifugally separated to obtain a catalyst product essentially free of cuprene and returned to the feed tank for reuse. The clear filtrate can be fed to a continuous distillation column which separates aqueous butynediol as bottoms. The overhead can be distilled in a second continuous column to separate methanol, some of which enters as an impurity with the formaldehyde and some of which may be formed from the formaldehyde in accordance with the Cannizzaro reaction. Recovered propargyl alcohol and formaldehyde can then be recycled to the synthesis reactor as an aqueous solution. The recycle of several percent of butynediol or propargyl alcohol to the reactor is desirable to stabilize the pH of the reaction mixture.

While high product rates (400 grams butynediol per liter of reactor space per hour) can be achieved by the use of relatively low formaldehyde conversion and higher recycle ratio, it is preferred to operate the process at high formaldehyde conversion per pass and moderate recycle. Correlation of the reaction variables is important to balance the cost of recycle against the space-time yield to gain maximum benefit from the process.

It has further been found possible to carry out this process in a commercially economic manner with the use of a crude mixture containing as little as 20% acetylene, obtained by cracking petroleum and concentrating the acetylene fraction. This mixture may be used directly with the formaldehyde.

The drawing is a schematic illustration of a suitable example of the process of this invention. In accordance therewith, aqueous formaldehyde is pumped from the feed tank 10 to mixing tank 12 where it is agitated with catalyst solids obtained from centrifuge 14 and recycled butynediol, propargyl alcohol, formaldehyde and methanol in water solution from recycle pump 16. From mixing tank 12, catalyst feed mixture is pumped by slurry feed pump 18 into the bottom of the synthesis reactor 20. Acetylene gas is brought into the bottom of the reactor through line 22 from the acetylene source 24. Part of the acetylene goes into solution and reacts with formaldehyde to produce 2-butyne-1,4-diol and propargyl alcohol while the remainder bubbles through the reaction mixture and helps to keep the catalyst evenly suspended. The heat of reaction is removed either by internal or external heat exchangers. The product and unreacted gases leave the reactor at the top through line 26 and the high pressure separator 30 where the gas is disengaged from the catalyst-liquid product stream. The product slurry is drained through line 32 to a separator 34, normally operated at about atmospheric pressure, where dissolved acetylene is flashed off. The released gas goes to a recycle pump or vent along with the gas from the high pressure separator 30 through line 36. The slurried product from the low pressure separator goes through line 38 to centrifuge 14 which removes the catalyst from the liquid product. The catalyst drops from the centrifuge through 40 to the feed mixing tank 12 and is reused in the synthesis. The clear liquid product from the centrifuge passes through line 42 to the stripper pump 44 which feeds the continuous distillation column 46. This column is operated at superatmospheric pressure with a steam heated reboiler. The aqueous butynediol product is recovered at the bottom of the column and drained to the butynediol product tank 48. The overhead from the butynediol column containing formaldehyde, propargyl alcohol, methanol and water goes through line 50 to the continuous distillation column 52 for methanol removal operating at atmospheric pressure. The column overhead is fed to the methanol storage tank 54 through line 56 and the still bottoms composed of formaldehyde, propargyl alcohol and water are continuously pumped by recycle pump 16 through line 58 back to the feed mixing tank. Fresh catalyst is prepared in a catalyst preparation tank 60 and added as needed to the feed mixing tank 12. The removal of spent catalyst is effected by taking out a portion of the catalyst from the centrifuge 14 through line 62.

A suitable ethynylation catalyst is prepared as follows:

An aqueous ammonium hydroxide solution is flushed with nitrogen to remove dissolved air and to flush air from the closed container. Cuprous chloride is then dissolved in the ammonia solution while nitrogen flushing is continued. When the desired amount of CuCl is completely dissolved, the catalyst carrier, either silica gel or activated carbon of 300 mesh size and finer, is added to the solution with agitation and cooling. The nitrogen flow is discontinued and acetylene started. The acetylene is allowed to pass through the mixture for 12 hours to make sure that the cuprous acetylide formation reaction is complete. The catalyst is filtered and washed thoroughly with distilled water to remove salts before use.

The following example illustrates a suitable moderate recycle process.

*Example 1*

A liquid feed of the following composition was continuously fed to the ethynylation reactor:

| Component: | Wt. percent |
|---|---|
| Catalyst (27.5% $Cu_2C_2$ on activated carbon) | 14.2 |
| Butynediol | 11.1 |
| Propargyl alcohol | 0.2 |
| Formaldehyde | 27.8 |
| Water | 45.4 |
| Methanol | 1.3 |

Acetylene gas was fed to the bottom of the reactor concurrently with the liquid feed at 95 p.s.i.g. pressure. The formaldehyde to acetylene mol ratio in the reactor was 1.30. The liquid feed passed upward through the reactor at 115° C. with a space velocity of 0.226 hr.$^{-1}$. This gave a catalyst retention time in the reactor of about 4.4 hours. The catalyst-product slurry overflowed at the top of the reactor into a separator where excess acetylene was removed for recycle or venting. The recovered slurry product had the following composition:

| Component: | Wt. percent |
|---|---|
| Catalyst ($Cu_2C_2$ on activated carbon) | 14.0 |
| Butynediol | 39.2 |
| Propargyl alcohol | 0.7 |
| Formaldehyde | 2.8 |
| Water | 41.8 |
| Methanol | 1.5 |

88.9% of the formaldehyde feed was converted to butynediol per pass and 1.4% to propargyl alcohol. 90.5 grams butynediol and 1.9 grams propargyl alcohol were produced per liter of reactor volume per hour. The product slurry was fed over a period of time to a suspended solid bowl centrifuge producing 2000 times gravitational acceleration. A water insoluble organic phase containing cuprene or precursor thereof, and of lower density than the aqueous phase, was discharged along with the aqueous product. After the discharge of liquids from the centrifuge ceased, the catalyst was washed with a small amount of water. The catalyst, essentially free of cuprene, was returned to the fresh feed tank for re-use. After a run of over 500 hours, the catalyst contained only 6 weight percent cuprene on a dry basis.

The clear liquid product, containing the small amount of cuprene by-product, was advanced to the butynediol recovery system. The composition of a typical feed to the recovery system was:

| Component: | Wt. percent |
|---|---|
| Butynediol | 39.3 |
| Propargyl alcohol | 0.7 |
| Formaldehyde | 3.2 |
| Water | 55.3 |
| Methanol | 1.5 |
| Cuprene by-product | Traces |

The above feed was charged to a 20 theoretical plate column operating at 40 p.s.i.g. pressure with a reflux ratio of five to one. The feed entered the column on the sixth plate from the top and was stripped and rectified to overhead and bottoms streams of the following compositions:

| Component | Wt. percent | |
|---|---|---|
| | Bottoms | Overhead |
| Butynediol | 46.40 | 2.32 |
| Propargyl alcohol | 0.00 | 5.31 |
| Formaldehyde | 0.09 | 20.30 |
| Water | 53.51 | 51.37 |
| Methanol | 0.00 | 12.70 |

The above bottoms stream was recovered as product while the overhead was added to similar overhead from previous operation and distilled to remove methanol before recycle to the butynediol synthesis unit. The methanol removal still consisted of a kettle provided with a reflux column with ten theoretical plates operating at atmospheric pressure with a reflux ratio of about ten to one. The composition of a typical feed to the methanol column was:

Component: Wt. percent
 Propargyl alcohol _____ 7.9
 Formaldehyde _____ 15.6
 Methanol _____ 12.6
 Water and butynediol (by difference) _____ 63.9

The feed entered the column on the third plate from the kettle and was separated into bottoms and overhead streams of the following composition:

| Component | Wt. percent | |
|---|---|---|
| | Bottoms | Overhead |
| Propargyl alcohol | 12.5 | 0.8 |
| Formaldehyde | 16.5 | 1.9 |
| Water determined | | 1.1 |
| Methanol | 2.5 | 96.2 |
| Water and Butynediol by difference | 68.5 | |

The bottoms from the methanol column were recycled to the synthesis reactor while the overhead was removed from the system. No cuprene was detected in the recycle.

*Example 2*

This example illustrates operation with low formaldehyde conversion and high recycle. A mixed feed of the following composition was fed to the butynediol synthesis reactor:

Component: Wt. percent
 Catalyst ($Cu_2C_2$ on activated carbon) _____ 11.0
 Butynediol _____ 7.2
 Propargyl alcohol _____ 0.0
 Formaldehyde _____ 26.9
 Water _____ 54.9

The above feed at a space velocity of 2.72 hr.$^{-1}$ and acetylene gas flowed upward through the reactor at 115° C. and 95 p.s.i.g. pressure. The formaldehyde to acetylene mol ratio in the reactor was 4.5. The product had the following composition:

Component: Wt. percent
 Catalyst ($Cu_2C_2$ on activated carbon) _____ 11.0
 Butynediol _____ 13.5
 Propargyl alcohol _____ 0.5
 Formaldehyde _____ 21.2
 Water _____ 53.8

17.6% of the formaldehyde feed was converted per pass. Space time yield was unusually high with 419 grams butynediol and 14 grams propargyl alcohol produced per liter reactor volume per hour.

The catalyst retention time in this example was about 0.37 hour. The catalyst slurried in the effluent liquid from the reactor was separated in a solid bowl centrifuge operated at 2000 $g$ to yield recovered catalyst essentially free of cuprene as in Example 1.

*Example 3*

This example illustrates a process wherein cracked petroleum was used. A liquid feed of the following composition was continuously fed to the ethynylation reactor:

Component: Wt. percent
 Catalyst (24.0% $Cu_2C_2$ on silica gel which
  passes 300 mesh) _____ 8.4
 Formaldehyde _____ 22.9
 Water _____ 68.7

The above feed flowed upward in the reactor concurrently with a gas of the following composition:

Component: Vol. percent
 Acetylene _____ 21.0
 Ethylene _____ 23.0
 Methane _____ 27.2
 Hydrogen _____ 26.0
 Carbon dioxide _____ 1.6
 Nitrogen _____ 1.2

The crude acetylene was fed to the bottom of the reactor concurrently with the liquid feed at 250 p.s.i.g. pressure. The formaldehyde to acetylene mol ratio in the reactor was 1.15.

The liquid feed was passed upward through the reactor at 130° C. with a space velocity of 0.25 hr.$^{-1}$. This corresponds to a catalyst retention time in the reactor of 4 hours.

The recovered liquid product had the following composition:

Component: Wt. percent
 Catalyst _____ 8.4
 Butynediol _____ 17.0
 Propargyl alcohol _____ 1.4
 Formaldehyde _____ 6.2
 Water _____ 67.0

The gaseous effluent had the following composition:

Component: Vol. percent
 Acetylene _____ 12.1
 Ethylene _____ 25.6
 Methane _____ 30.3
 Hydrogen _____ 28.9
 Carbon dioxide _____ 1.8
 Nitrogen _____ 1.3

Sixty-three percent of the formaldehyde feed and 48.3% of the acetylene was converted to butynediol per pass. Butynediol was produced at a space-time yield of 56.9 grams per liter per hour.

The catalyst slurried in the effluent liquid from the reactor was separated in a solid bowl centrifuge operated at 2000 $g$ to yield recovered catalyst essentially free of cuprene as in Example 1. If desired, the gaseous effluent from the reactor may be used as a fuel or the unreacted acetylene may be further reacted to produce more butynediol.

This application is a continuation-in-part of application Serial No. 635,823, filed January 23, 1957, now abandoned.

Although certain preferred embodiments of the invention have been disclosed for purpose of illustration, it will be evident that various changes and modifications may be made therein without departing from the scope and spirit of the invention.

I claim:
1. A continuous cyclic process for the production of butynediol which comprises:
 (a) continuously passing formaldeyhyde and acetylene through a reaction zone at a pressure of 75 to 125 p.s.i.g. and at a temperature of 115 to 135° C. con- currently with cuprous acetylide catalyst supported on a carrier of a size to pass through 300 mesh in an aqueous slurry;

(b) continuously discharging said catalyst from said zone as a slurry in the reaction product, with a catalyst retention time in the reactor ranging from 0.25 to 5 hours;

(c) centrifuging in a solid bowl centrifuge said slurry of said catalyst in the reaction product at at least 960 times the gravitational acceleration to separate said catalyst from the component liquid phases of the reaction product said liquid phases being an organic by-product phase and an aqueous product phase, said phases being mutually insoluble, said organic-by-product phase containing soluble cuprene and being less dense than said aqueous product phase and said catalyst:

(d) recycling said catalyst for commingling with the feed stream of fresh acetylene and formaldehyde to the reactor; and (e) recovering butynediol by fractional distillation of said liquid phases separated from said catalyst.

2. A process according to claim 1 wherein the cuprous acetylide proportion of the supported catalyst is 20 to 30% by weight, the support is of the group consisting of silica gel and activated carbon; and the supported catalyst proportion in the aqueous slurry is 7 to 14% by weight.

3. A continuous cyclic process for the production of butynediol which comprises:

(a) continuously passing formaldhehyde and a gaseous product of petroleum cracking containing about 20% by volume of acetylene through a reaction zone at a pressure of 75 to 350 p.s.i.g. and at a temperature of 115 to 135° C. concurrently with a finely divided supported cuprous acetylide catalyst in an aqueous slurry;

(b) continuously discharging said catalyst from said zone as a slurry in the reaction product, with a catalyst retention time in the reactor ranging from 0.25 to 5 hours;

(c) centrifuging in a solid bowl centrifuge said slurry of said catalyst in the reaction product at at least 960 times the gravitational acceleration to separate said catalyst from the component liquid phases of the reaction product said liquid phases being an organic by-product phase and an aqueous product phase, said phases being mutually insoluble, said organic by-product phase containing soluble cuprene and being less dense than said aqueous product phase and said catalyst;

(d) recycling said catalyst for commingling with the feed stream of fresh acetylene and formaldehyde to the reactor; and (e) recovering butynediol by fractional distillation of said liquid phases separated from said catalyst.

4. A process for the production of butynediol according to claim 3 wherein the cuprous acetylide is supported on a silica gel carrier of a size to pass through 300 mesh and is present on the carrier in proportion of 20 to 30% by weight; said supported catalyst is present in said aqueous slurry in a proportion of 7 to 14% by weight and the reactor is operated at a pressure of about 250 p.s.i.g. and at a temperature of about 130° C.

References Cited in the file of this patent

UNITED STATES PATENTS 2,232,867    Reppe et al    Feb. 25, 1941

FOREIGN PATENTS 698,019    Great Britain    Oct. 7, 1953